United States Patent
Lee et al.

(10) Patent No.: US 7,647,230 B2
(45) Date of Patent: Jan. 12, 2010

(54) METHOD AND APPARATUS FOR TRACKING A SPECIAL SERVICE DELIVERY OF A MAIL ITEM CREATED BY AN OFFICE WORKER

(75) Inventors: David K. Lee, Monroe, CT (US); Leon A. Pintsov, West Hartford, CT (US)

(73) Assignee: Pitney Bowes Inc., Stamford, CT (US)

( * ) Notice: Subject to any disclaimer, the term of this patent is extended or adjusted under 35 U.S.C. 154(b) by 1859 days.

(21) Appl. No.: 09/928,292

(22) Filed: Aug. 10, 2001

(65) Prior Publication Data

US 2002/0029153 A1    Mar. 7, 2002

Related U.S. Application Data

(63) Continuation-in-part of application No. 09/703,231, filed on Oct. 31, 2000, which is a continuation-in-part of application No. 09/339,768, filed on Jun. 24, 1999, now Pat. No. 6,532,452.

(51) Int. Cl.
    *G06Q 99/00* (2006.01)
(52) U.S. Cl. ............... 705/1; 705/34; 705/401; 235/462.01; 235/472.01
(58) Field of Classification Search ......... 705/400–410, 705/34, 26, 1; 235/462.01
    See application file for complete search history.

(56) References Cited

U.S. PATENT DOCUMENTS

| | | | |
|---|---|---|---|
| 4,106,060 A | 8/1978 | Chapman, Jr. | 358/256 |
| 5,008,827 A | 4/1991 | Sansone et al. | 364/464.02 |
| 5,025,386 A * | 6/1991 | Pusic | 700/227 |
| 5,058,008 A | 10/1991 | Schumacher | 364/401 |
| 5,388,049 A | 2/1995 | Sansone et al. | 364/464.02 |
| 5,612,884 A | 3/1997 | Haines | 364/464.13 |
| 5,612,889 A | 3/1997 | Pintsov et al. | 364/478.14 |
| 5,648,916 A | 7/1997 | Manduley | 364/514 A |
| 5,699,258 A | 12/1997 | Thiel | 364/464.19 |
| 5,712,712 A | 1/1998 | Sayward | 358/403 |
| 5,726,894 A | 3/1998 | Sansone | 364/464.18 |
| 5,737,729 A | 4/1998 | Denman | 705/401 |
| 5,768,132 A | 6/1998 | Cordery et al. | 364/464.2 |
| 5,794,789 A | 8/1998 | Payson et al. | 209/549 |
| 5,805,810 A | 9/1998 | Maxwell | 395/200.36 |

(Continued)

FOREIGN PATENT DOCUMENTS

WO    WO 99/21330    4/1999

OTHER PUBLICATIONS

"UPS Backgrounder: When Is Package Tracking, Really Tracking?", Mar. 1, 1999, PR Newswire: New York; 4 pgs.*

*Primary Examiner*—John W Hayes
*Assistant Examiner*—Freda A Nelson
(74) *Attorney, Agent, or Firm*—Ronald Reichman; Angelo N. Chaclas

(57) ABSTRACT

A method and apparatus for tracking a special service delivery by a carrier of a mail item created by an office worker. The method utilizes one or more special service indicators on the mail item to ensure that the office worker can obtain information about the status of the mail item by the simple placement of one of the special service stickers on the mail item.

13 Claims, 7 Drawing Sheets

U.S. PATENT DOCUMENTS

| | | | |
|---|---|---|---|
| 5,826,034 A | 10/1998 | Albal | 395/200.69 |
| 5,859,967 A | 1/1999 | Kaufeld et al. | 395/186 |
| 5,875,302 A | 2/1999 | Obhan | 395/200.55 |
| 5,905,868 A * | 5/1999 | Baghai et al. | 709/224 |
| 5,918,220 A | 6/1999 | Sansone et al. | 705/408 |
| 5,936,865 A | 8/1999 | Pintsov et al. | 364/478.14 |
| 5,978,781 A | 11/1999 | Sansone | 705/408 |
| 6,018,774 A | 1/2000 | Mayle et al. | 709/250 |
| 6,038,601 A | 3/2000 | Lambert et al. | 709/226 |
| 6,047,264 A | 4/2000 | Fisher et al. | 705/26 |
| 6,047,273 A | 4/2000 | Vaghi | 705/410 |
| 6,052,671 A | 4/2000 | Crooks et al. | 705/34 |
| 6,072,862 A | 6/2000 | Srinivasan | 379/100.08 |
| 6,216,127 B1 | 4/2001 | Gans et al. | 707/10 |
| 6,229,884 B1 | 5/2001 | Toyoda et al. | 379/100.08 |
| 6,233,317 B1 | 5/2001 | Homan et al. | 379/88.05 |
| 6,233,318 B1 | 5/2001 | Picard et al. | 379/88.17 |
| 6,289,323 B1 | 9/2001 | Gordon et al. | 705/40 |
| 6,394,354 B1 * | 5/2002 | Wilz et al. | 235/472.01 |
| 6,510,997 B1 * | 1/2003 | Wilz et al. | 235/472.01 |
| 7,117,170 B1 * | 10/2006 | Bennett et al. | 705/34 |
| 2002/0046194 A1 * | 4/2002 | Gelfer | 705/401 |
| 2003/0173405 A1 * | 9/2003 | Wilz et al. | 235/462.01 |
| 2004/0139097 A1 * | 7/2004 | Farber et al. | 707/100 |

* cited by examiner

| EAI | ID TAG/TIME STAMP AND LOCATION CODE 41 | TRAY ID/TIME STAMP AND LOCATION CODE 55 | PALLET ID/TIME STAMP AND LOCATION CODE 57 | TRANSPORTATION UNIT ID/TIME STAMP AND LOCATION CODE 59 |
|---|---|---|---|---|
| <<sender@gooddomain.com>>ll <<1234567>> 54 | <<ID13765456986778832>> <<3:10 PM: 03012001>> <<064>> 61 41 | <<TID9876564322>> <<3:30PM:03012001>> <<064>> 63 55 | <<PID3427564>> <<12:10 PM: 03022001>> <<084>> 65 57 | <<DL127/234587>> <<2:10 PM: 03022001>> <<143>> 67 59 |
| <<sender@gooddomain.com>>ll <<1234568>> 54 | <<ID45678556986778834>> <<9:10 PM: 03012001>> <<064>> 69 41 | <<TID9876564323>> <<8:35AM:03012001>> <<064>> 71 55 | <<PID3427546>> <<12:10 PM: 03022001>> <<084>> 73 57 | <<DL127/234785>> <<3:10 PM: 03022001>> <<144>> 75 59 |
| <<mailerr@gooddomain.com>>ll <<0000017>> 54 | <<ID13765456986766475>> <<12:07 PM: 03012001>> <<964>> 41 | <<TID7896564223>> <<3:30PM:03012001>> <<064>> | <<PID3427564>> <<12:10 PM: 03022001>> <<089>> | <<DL127/234587>> <<4:10 PM: 03022001>> <<134>> |

METHOD AND APPARATUS FOR TRACKING A SPECIAL SERVICE DELIVERY OF A MAIL ITEM CREATED BY AN OFFICE WORKER

CROSS REFERENCE TO RELATED APPLICATIONS

This application is a continuation-in-part of U.S. Ser. No. 09/703,231 filed on Oct. 31, 2000 which is a continuation-in-part of U.S. Ser. No. 09/339,768 filed on Jun. 24, 1999. This application is also related to subject matter contained in U.S. Ser. No. 09/339,769 filed on Jun. 24, 1999 now U.S. Pat. No. 6,532,452 and the United States Patent Application entitled "METHOD AND APPARATUS FOR TRACKING MAIL ITEMS THROUGH A CARRIER DISTRIBUTION SYSTEM" filed on Aug. 10, 2001.

BACKGROUND OF THE INVENTION

Mail communication systems (for purposes herein such systems include postal services as well as private carrier services) are designed to provide for the delivery of physical mail items. These systems include mailers (senders of mail items), service providers (carriers and postal operators and their suppliers) and recipients. When a mailer sends a physical mail item (letter, flat, or parcel) he or she is typically interested in 1) knowing that the mail item has been delivered, 2) knowing the time of delivery and 3) in many cases having some (hopefully legally admissible) proof of delivery. Moreover, the mailer may also be interested in checking on the status of a yet to be delivered mail item particularly if there is some concern that the mail item may be lost. Traditional postal and carrier systems address this need by offering premium "track & trace" services. These traditional track and trace services assign a unique carrier generated number to each mail item which is used to track the mailpiece through the carrier distribution system. Confirmation of final delivery of the mail item is accomplished by either providing the sender with a physical document containing information about delivery or alternatively allowing the sender to access a web site of the service provider where the unique carrier generated number can be found if the mail item has been delivered. Additionally, inquiries regarding mail item tracking status are checked via the unique carrier assigned number.

One of the major problems of these traditional track and trace services is that the sender must go to the carrier's retail location to deliver the mail item personally in order to get the unique carrier generated number. Additionally, while some carriers have now introduced the ability to obtain a unique carrier generated number over the internet which can be applied to the mailpiece by the sender, this approach has the downside of requiring the sender to be connected to the carrier's website via the internet whenever use of the track and trace service is required. Furthermore, in the web-based system just described, the carrier loses control of ensuring that a particular unique carrier generated number was actually affixed to a specific mailpiece.

Each of the aforementioned United States Patent Applications address one solution to some of the problems set forth above by having the sender provide on a mail item a unique sender generated identifier consisting of a unique number and an electronic address such as an e-mail address of the sender. This identifier can then be used by the carrier service to provide information to the e-mail address about, for example, the delivery of the mail item. The problem with this solution is that it relies on the sender generated unique number for tracking the mailpiece. Carriers may consider this to be unacceptable since they would have to rely on the quality of the sender generated unique number for tracking mail items through their system.

In addition to the above, yet another problem exists in an office building environment where mail is generated by individual office workers and sent to a mailroom for final processing. That is, the function of the mail room is to collect mail items created by office workers, finish the mail items by applying postage thereon and submit the mail items to postal operators (or other carrier) for processing and delivery. Mail rooms are typically equipped with mailing machines, postage meters, scales and other equipment for mechanization of such finishing work. Conventional mailing machines are capable of automatic feeding, sealing and metering of mixed mail items. However, currently there is no effective way of processing value added services mail items (mail that is accounted for such as proof of deposit, receipt, or delivery—also referred to previously as premium service mail items) through a mailing machine. Thus, these premium service mail items have to be created and processed in essentially a manual way.

Accordingly, what is needed is a system and method that allows office workers to obtain track and trace and/or confirmation of special services delivery of a mail item in a more automated manner than the prior art systems.

SUMMARY OF THE INVENTION

The instant invention provides a method for tracking a special service delivery by a carrier of a mail item created by an office worker, the method including the steps of applying a special service indicator to the mail item during creation of the mail item; sending the mail item to a mail room for final processing prior to submitting the mail item to the carrier for the special service delivery; automatically detecting the special service indicator on the mail item and determining the special service delivery required based on the detection of the special service indicator; and applying at the mail room a unique identifier to the mail item, the unique identifier including an electronic address of a company server. The method further includes submitting the mail item with the unique identifier thereon to the carrier for the special service delivery; receiving from the carrier at the electronic address obtained by the carrier from the unique identifier on the mail item information relating to the location of the mail item; storing the information relating to the location of the mail item at the company server; and providing the office worker with access to the company server to obtain the information relating to the location of the mail item.

In yet a second embodiment there is provided a method for tracking a special service delivery by a carrier of a mail item created by an office worker, the method including the steps of applying a first special service indicator to the mail item during creation of the mail item; sending the mail item to a mail room for final processing prior to submitting the mail item to the carrier for the special service delivery; automatically detecting the first special service indicator on the mail item and determining the special service delivery required based on the detection of the first special service indicator; and applying at the mail room a second special service indicator to the mail item, the second special service indicator including an identification of the special service delivery required and a unique identifier including an electronic address of a company server. The method further includes submitting the mail item with the unique identifier thereon to the carrier for the special service delivery; receiving from the carrier at the electronic address obtained by the carrier from the unique identifier on the mail item information relating to the location of the mail item; storing the information relating to the location of the mail item at the company server; and providing the office worker with access to the company server to obtain the information relating to the location of the mail item.

The instant invention also provides a mailing machine having apparatus for applying postage to a mail item having a first special service indicator thereon; structure for transporting mail items to the applying apparatus; apparatus for detecting the first special service indicator and for determining a special service delivery required based on the detected special service indicator; and apparatus for applying a second special service indicator to the mail item, the second special service indicator including an electronic address and an identification of the special delivery required.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 5 shows a Status Monitoring DataBase;

DETAILED DESCRIPTION OF THE PREFERRED EMBODIMENTS

Figure 1:
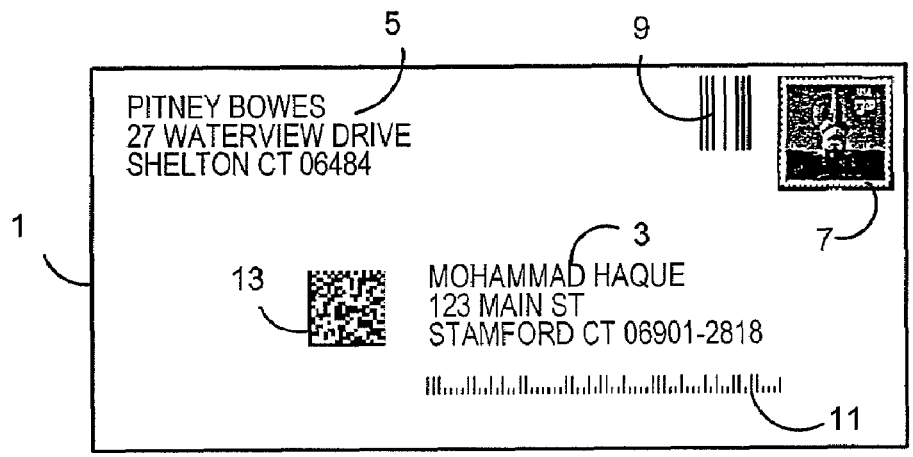
FIG. 1 shows a mail item used in the instant invention.

Referring to FIG. 1, a mail item 1 is shown having a recipient address 3, a return address 5, evidence of postage paid 7, a facing identification mark (FIM) 9, a postnet barcode 11, and an electronic address and identifier mark (EAIM) 13. The EAIM 13 can be, for example, the electronic address of the sender such as (<<sender@gooddomain.com>>) combined with a unique number <<1234567>>. This combination is a unique identification for the specific mail item 1. In this example, the unique combination [<<sender@gooddomain.com>>||1234567>>] is the unique identification for the item number 1234567 and is represented on the mail item 1 (in a reliable machine readable format, for example in one of the well known in the art linear or two dimensional bar codes (e.g. code 128 or DataMatrix.)) as the EAIM 13. The unique identification information

[<<sender@gooddomain.com>>||1234567>>]

is referred to herein as the Electronic Address and Identifier (EAI) and when represented on the mail item 1 in a machine-readable format becomes the EAIM 13.

Figure 2:
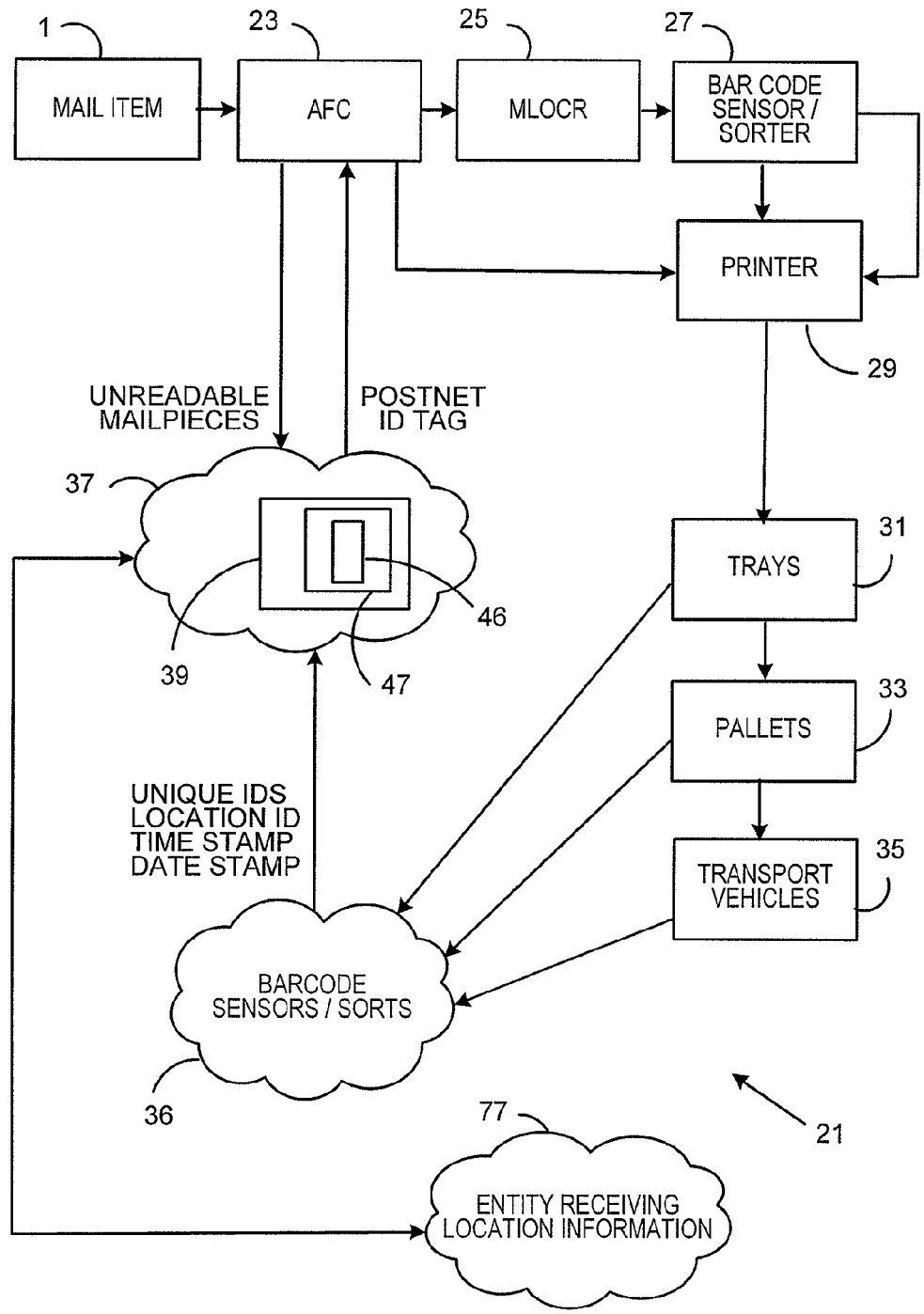
FIG. 2 is a schematic representation of the inventive carrier distribution system.

Referring to FIG. 2, implementation of the instant invention in a postal distribution system 21 is shown. In current postal systems when mailpieces are inducted into the delivery-processing network, they are sent to an advanced facer/canceler 23 (AFC). The AFC 23 performs two primary functions. First, it uses sensors to identify and determine on which side of each mailpiece the evidence of postage payment 7 (i.e. stamp, indicium, etc.) and the recipient address 3 are located. Once the location of the recipient address 3 has been identified, the AFC 23 faces (positions) the mailpiece in a proper orientation to allow for the subsequent machine processing of the mailpiece through the distribution network. Secondly, the AFC 23 prints a cancellation mark over the evidence of postage payment 7 if such evidence 7 is identified by the AFC 23 as being a stamp(s).

The AFC 23 also scans the recipient address 3 and sorts individual mailpieces into two categories. The first category are those that have a machine-readable address while the second category are those that have an address which cannot be read by a machine. The machine-readable pieces are processed to a multiple line optical character recognition (MLOCR) device 25 where the recipient address is read. At this point in time, if these mailpieces do not have a postnet barcode 11 printed thereon which is detected by a bar code sensor 27, one is applied at a bar code printer 29. All mailpieces are then processed for delivery in the conventional manner using the postnet barcode 11 for delivery sorting purposes. That is, based on the postnet barcode 11 the mailpieces are aggregated in trays 31 for delivery to common delivery distribution points. The trays 31 are placed on pallets 33 and the pallets 33 aggregated on transportation vehicles 35 (collectively refereed to as mail item receptacles). Upon delivery to individual distribution points, additional bar code sensors 36 are used to sort these mailpieces down to an even further level until they are ultimately delivered to the recipient. There are also unique numbers assigned by the carrier to the trays 31, pallets 33, and transportation vehicles 35 which are used for tracking those mail item receptacles through the distribution network.

Returning to the unreadable mailpieces, the AFC 23 is equipped with the capability to capture a digital image of these mailpieces. These images are sent to a location 37 (which may or may not be remotely located from the AFC 23) where an operator views the image and determines the address and associated postnet barcode. The operator enters this data into a database 39 and a computer automatically assigns a unique identification tag (ID Tag) which is linked to the mailpiece image in the database 39. The computer provides the AFCS 23 with the ID Tag and the postnet barcode 11 for the mailpiece. The AFCS 23 interfaces with the barcode printer 29 in a conventional manner to effectuate printing of the ID Tag and the postnet barcode 11 on the mailpiece.

Figure 3:
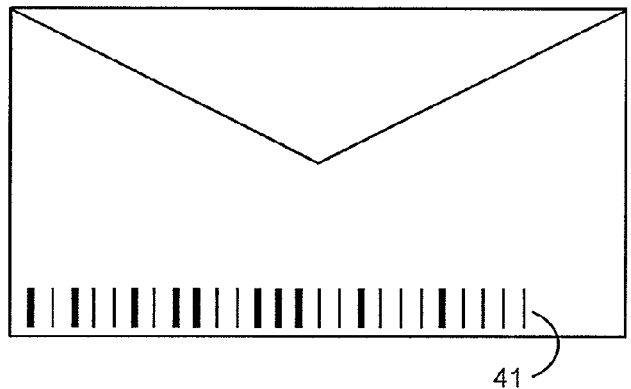
FIG. 3 shows an ID Tag printed on a mailpiece.

FIG. 3 shows the back of the mailpiece having an ID Tag 41 applied thereto. Once printing of the ID tag 41 and the postnet barcode 11 on the mailpiece is accomplished, the originally identified unreadable mailpieces are placed in trays 31, pallets 33, and transportation vehicles 35 together with other mailpieces for further processing as described above in connection with the readable mailpieces. The ID tag 41 is presently not used for any type of track and trace service but simply provides a link between the unreadable mailpiece image and the unreadable mailpiece itself.

Figure 4:
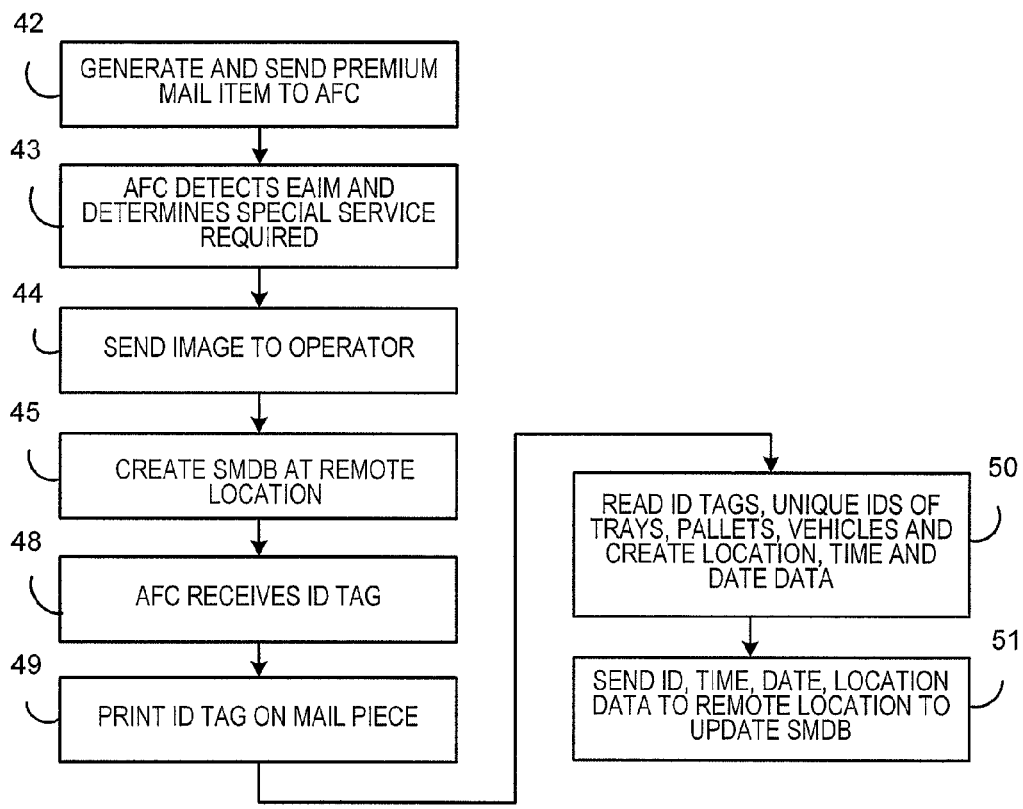
FIG. 4 is a flowchart describing the processing of a mail item within the carrier distribution system of FIG. 2.

The postal distribution system 21 of the present invention takes full advantage of the existing AFC 23 and ID Tag 41 generation functionality. That is, the AFC 23 and ID tag 41 generation apparatus modules are modified as discussed below to be used for track and trace and/or confirmation delivery services since the ID Tag 41 is a unique carrier generated identifier. Specifically, referring to FIGS. 2 and 4, when a premium mail item 1 which requires electronic confirmation and/or track and trace service is sent to the AFC 23 (step 42), the AFC 23 (which has been modified in accordance with the present invention) determines that the mail item 1 requires such special processing by detecting the EAIM 13 on the face of the mail item 1 (step 43). When the AFC 23 determines that the mail item 1 requires electronic confirmation and/or track and trace services, it sends the image of the mail item 1 to the operator processing computer 37 (step 44). The operator computer creates (or obtains) the ID Tag 41 for the mail item 1 and also creates a record 46 in the data base 39. The record 46 includes the EAI of the mail item 1 together with its ID Tag 41 and, if desired, its electronic image. The EAI is obtained from reading the EAIM off the mailpiece at the AFC 23 or from the electronic image at the operator location 37 These premium service records 46 form their own data base 47 referred to herein as a Status Monitoring Data Base or SMDB (step 45). The AFC 23 receives the ID Tag 41 (step 48) which it imprints through bar code printer 29 on the item 11 (step 49). The instant invention recognizes that the unique ID Tag 41 can be used in all subsequent steps in the processing and delivery of the mail item 1 That is, wherever there are bar code sensors 29 within the postal distribution system, the ID Tag 41 can be detected and its location determined.

The SMDB 47 contains, in addition to the EAI, electronic image, and ID Tag 41, time stamps and identity information for locations for different important events (arrivals and departures of the mail item 1 to and from different facilities and change of control over the item) as well as time stamps and locations of mail item 1 during regularly scheduled data captures. All of this data capture is made possible by detecting the ID tag 41 at any location having a bar code sensor 29 (such additional bar code sensors are shown collectively at 36 for the sake of simplicity of explanation).

It is important to emphasize that currently, capturing data directly from the mail item 1 is normally possible only at the very beginning and very end of the processing cycle when mail item is not grouped and packaged together with other items. However, the instant invention recognizes that when the mail item 1 is a part of a group physically located within a tray 31, pallet 33, or transportation vehicle 35 or other receptacle, the mail item 1 record 46 is amended to include the identity of the specific mail item receptacle in which it has been placed for delivery. This allows trace location of the mail item 1 through the entire postal processing cycle even where individual mailpieces 1 are not being handled since the location of the corresponding mail item receptacles are tracked via their unique numbers which are typically contained in bar-coded labels placed thereon. That is, as the mail item 1 or other receptacles are processed by any one of the sensors 36 the ID tags are read and corresponding location, date, and time data are created (step 50). The sensors send the location time, date, and location data to the location 37 where the SMDB 47 is continuously updated during mail item 1 processing by adding a time stamp, a date stamp, and the location of the mail item 1 itself or receptacle in which it is contained based on the received data (step 51). From this viewpoint, any means of transportation used by postal operators (trucks, railroad cars or aircrafts) can be viewed as receptacles with a specific identity.

An example of an SMDB 47 is shown in FIG. 5. The SMBD 47 includes the individual data records 46 consisting of individual mailpiece 1 EAI's 54, as well as ID Tag 41, and tray 31, pallet 33 and transportation vehicle 35 ID's 55, 57, and 59. The SMBD 47 is a dynamic data base which is continuously updated as the mail item 1 is being processed through the postal system distribution system 21. At each step along the way the mail piece 1 or receptacle identity is captured, and the records 46 are supplemented with time 61, 63, 65, and 67 stamps, and location stamps 69, 71, 73, and 75 These updates are electronically sent to (preferably) a centrally maintained SMDB 47. SMDB 47 can be maintained on a central server connected through a public communication network (e.g. Internet) to all data capture terminals (27, 36). In practice the data capture terminals (27, 36) can be stand-alone bar code readers or a portable PC with attached bar code scanner. The terminals can be connected to the public communication network through a wired or wireless connection depending on the cost and convenience required. Moreover, the system can be implemented as a private network. These arrangements are well known in the art. Thus, the SMDB 47 contains all required information for tracing lost items as well as other possible inquiries concerning the mail item 1 status that can be made by senders, recipients, and postal employees (collectively referred to in FIG. 2 as entity 77).

As discussed above, the AFC 23 can also be retrofitted to not only detect but also to read the contents of the EAIM 13 to capture EAI information from the mail item 1. This captured information can automatically be used to send an electronic confirmation to the sender, such as for example, by using e-mail. This step can be made particularly effective if the EAIM 13 is imprinted within the destination address block 3, for example, left of it as depicted in FIG. 1. This arrangement has three significant advantages. First, the destination address block 3 must be examined by the AFC 23 anyway as discussed above. Thus, finding and interpreting the EAIM 13 when it is present within the address block 3 is easier than when the EAIM 13 is elsewhere. Second, the EAIM 13 printing can be simplified if it is imprinted on the destination address-bearing document and made visible through a window in the envelope. This allows creation and printing of all required information on a document or a standard form avoiding separate printing or affixing of labels to the envelope. Third, the EAIM 13 can be formatted in such a way that its size is indicative of the vertical size of the destination address block 3 (this can be done for example by manipulating vertical dimension of modules in two-dimensional bar codes). In this manner the EAIM 13 block becomes a destination address block 3 locator mark if it is present left or right of the address. Because a two-dimensional bar code representation for the EAIM 13 is highly distinguishable from regular text, it makes finding and parsing the destination address block 3 much easier. Note, that if the EAIM 13 is represented in a linear bar code it can also be formatted and printed as an address block 3 locator For example, the EAIM 13 can be divided into 2 parts one of which can be vertically oriented and have a size of the vertical dimension of the address block, while the other can be horizontally oriented and have a size of the horizontal dimension of the address block 3.

As has been clearly demonstrated above, the SMBD 47 links the unique sender generated EAIM 13 with the unique carrier generated ID Tag 41. Accordingly, the sender can always check the status of or automatically receive information about the mailpiece 1 simply by knowing the user generated EAI information while the carrier can track the mailpiece 1 by relying on the carrier generated ID Tag 41. Thus, the instant invention provides the following benefits;

1.—The sender no longer has to interface with the carrier in advance to obtain a pre-assigned carrier tracking number that must be placed on the mailpiece. This eliminates either the personal delivery of the mail item 1 to the carrier by the sender or the need to interface online prior to submitting the mail item 1 into the carrier's distribution system.

2.—The sender can now generate a premium service mailpiece 1 independent of the carrier and simply deposit it into any carrier receptacle (i.e. street letterbox) and still be assured of obtaining the benefit of the premium service.

3.—The use of a unique carrier generated ID Tag 41 avoids the expensive and inefficient process of preprinting specialized labels that typically use linear barcodes containing unique non-overlapping numbers that must be distributed to the senders prior to mailing. (Otherwise, if the mailers create these unique identification numbers the carrier can not guarantee that they will be unique. Another problem with these specialized labels is that they are often not precisely located on the surface of the mailpiece and thus require special handling in order to be read.

4.—The system of present invention allows use of internal postal ID tags 41 as they have been already defined without any involvement of customers. These postal ID tags 41 can be easily read by existing equipment already designed for processing bar codes. Moreover, the changes required at the AFCS 23, the addition of bar code readers at various points in the carrier distribution system to read the ID tags 41 and/or the EAIM 13, and the generation of the SMDB 47 to link all of the information together requires a minimal amount of modification to the existing postal distribution infrastructure.

The present invention also leverages the use of the commonly referred to Carrier Sequence Bar Code Sorters (CSBCS) for the purpose of facilitation of electronic confirmation of delivery. Typically, mailers (senders) want to know that their mail items have been delivered into recipient's mailbox. Such service is difficult to organize effectively and at low cost since most mail carriers do not use any equipment and essentially utilize manual processes. However, most mailers would be very satisfied if they would have assurances that their mail reached the postal delivery office nearest to its final destination mailbox. The reason for this is that the chances that mail will be lost during the final delivery process (sometimes called last mile process) are fairly small taking into account the generally established reliability of the postal service. Thus, when the mail arrives at the delivery office it would be quite sufficient for the mailer to receive confirmation of this event for most purposes.

Currently, when letter mail arrives at the delivery office it is more and more frequently processed by a CSBCS. The CSBCS takes mail already sorted to the carrier route level and sorts it for final delivery, stop by stop. In the USA the process takes several thousands mail items (letters) and sorts them into a sequence of several hundreds stops. The CSBCS is equipped with an imaging system to capture bar coded postage delivery codes. The imaging system of the CSBCS can be modified to capture the digital image of the mail item 1 and ID tags 41 as they are described above. In this case the CSBCS with a modified imaging system can automatically capture the image of the mail item 1, find and interpret the EAIM 13 and send a required electronic confirmation to the original sender using the e-mail address in the EAM 13. Importantly, all these procedures can be executed automatically during the CSBCS mail sorting process. In addition, the CSBCS can interpret ID tags 41 and store ID tag 41 information together with the digital image of mail item 1 requiring electronic confirmation of delivery. In this fashion, if the mail item 1 occasionally gets lost during final delivery and the mailer learns from his/her correspondent about its non-delivery, the fact of arrival of the mail item 1 into delivery office can be easily established. This information is useful in finding the reasons for non-delivery and the ultimate recovery of the item. Stored images together with the ID tags 41 can be discarded after a pre-specified period of time, for example 3 days, thus reducing the cost of the storage. The storing of this data can be done locally or included in the SMDB 47 as discussed above.

Figure 6:
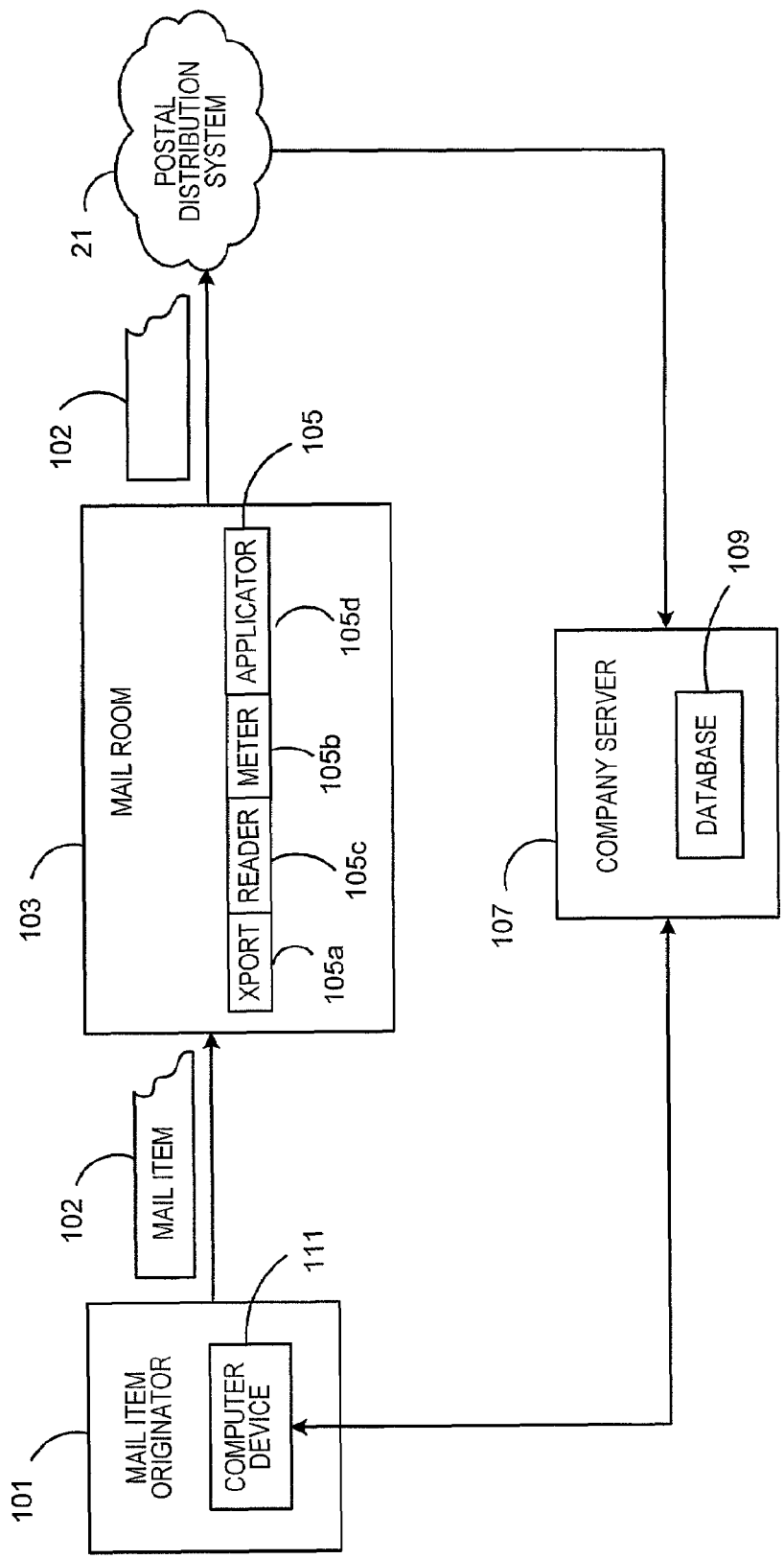
FIG. 6 shows a schematic representation a mail generation and delivery system.
Figure 7:
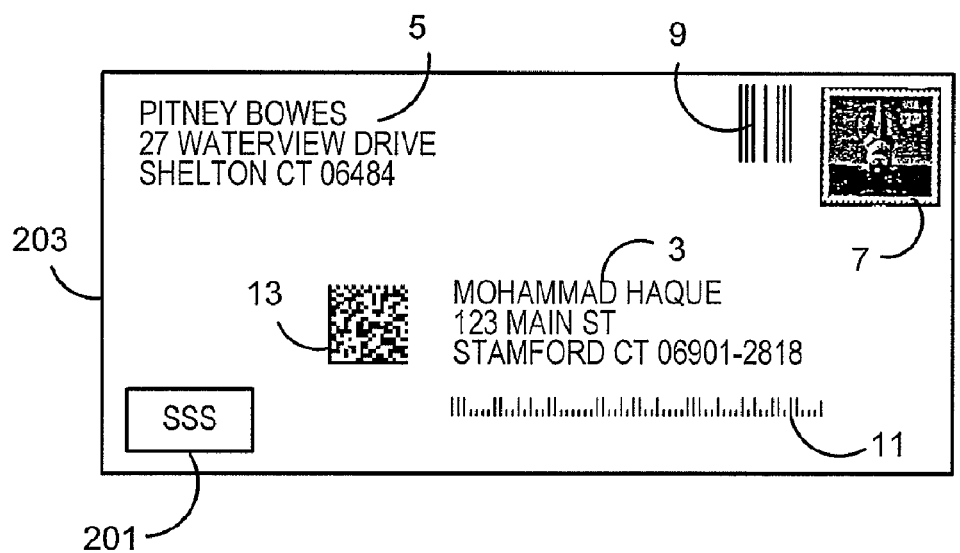
FIG. 7 shows a special service sticker on a mail item.
Figure 8:
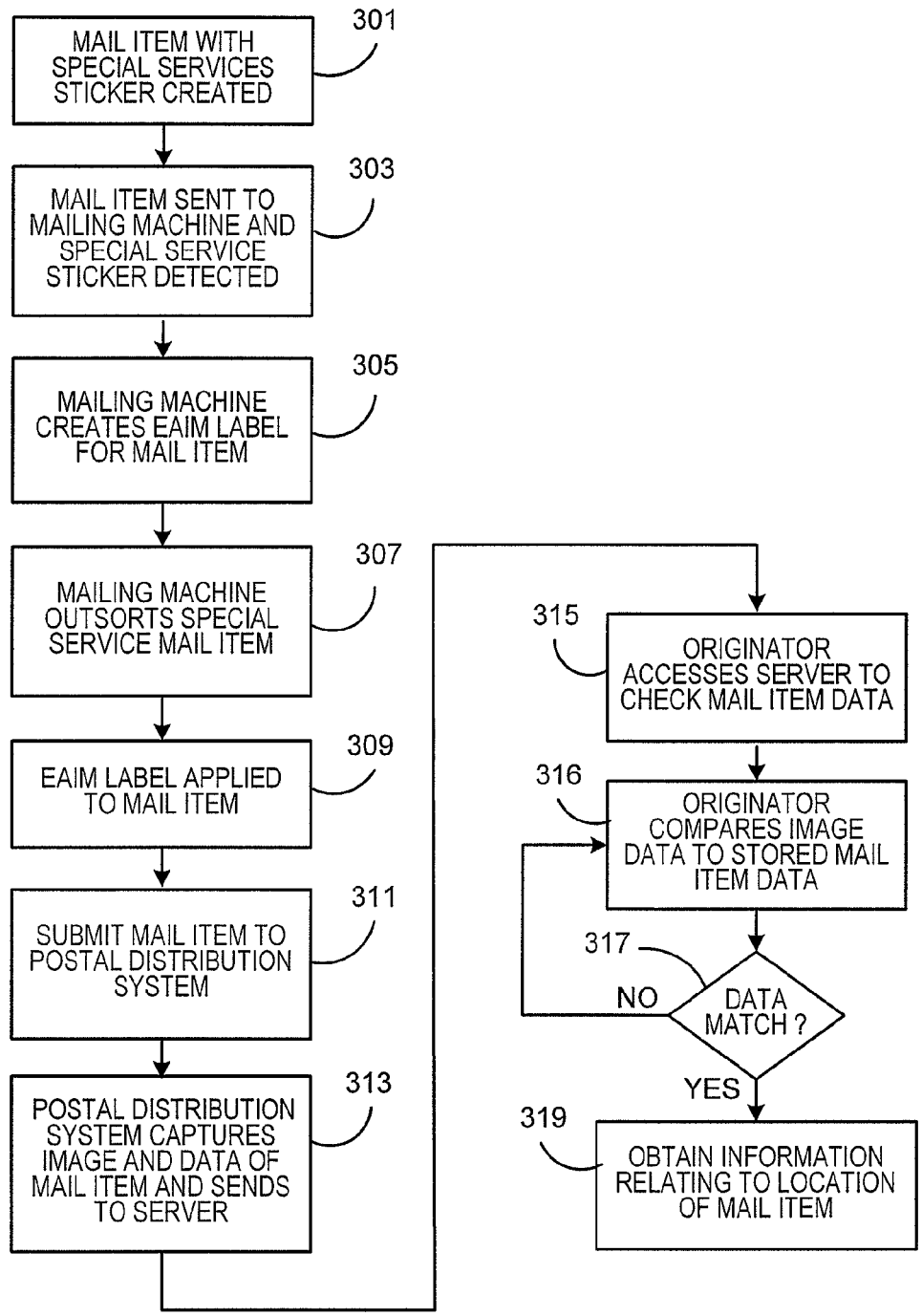
FIG. 8 is a flow chart of the operation of the system of FIG. 6.

FIGS. 6-8 show how the inventive concepts previously discussed herein are applied for use in an office building environment. The mail generation and delivery system (MGDS) 100 of FIG. 5 includes an originator 101 of a premium service mail item 102, a mail room 103 including a mailing machine 105, a postal distribution system such as the system 21 of FIG. 2, and a company server 107 having a database 109 associated therewith which is discussed in more detail further below. The server 107 is a company computer which is accessible by all authorized company employees through a desk top, lap top, or palm top computing device (collectively referred to at 111). The server 107 has an electronic address (URL) that uniquely identifies it and permits connection to the server 107 via a public network. The mailing machine 105 includes a conventional mail item transport 105*a* which delivers the mail item to a conventional postage meter 105*b* which applies the postage to the mail item. As discussed further below and in accordance with the instant invention, the mailing machine 105 further includes a detector/reader 105*c* and a special service sticker applicator 105*d*.

In operation, the MGDS 100 is initiated when an office worker 101 generates a mail item 102 (either manually or through the computer 111) and submits it to the mail room 103 for finishing work and delivery to the postal distribution system 21. The mail item 102 has a special services sticker (SSS) 201 applied thereto that identifies the mail item 102 as requiring a special service (step 301). The SSS is easily distinguishable such as by being color coded to identify a specific special service associated with a specific color. For example, if only proof of deposit, delivery, and receipt are required, than office workers can be supplied with sufficient amounts of red, blue, and green SSS 201's that correspondingly indicate the need for proof of deposit, delivery, and receipt. The location of the SSS 201 must be non-interfering with other present and future planned information that the mail item 102 must carry (for example digital postage marks, stamps, postnet barcode, etc.). As shown in FIG. 7, the SSS 201 has been placed in the bottom left hand corner on the front of the envelope 203. However, the back of the envelope 203 could also be used for placement of the SSS 201. In any event, the SSS 201 clearly enables the discrimination between mail items requiring special services and those that do not.

While color coded stickers can be used, in another embodiment preprinted labels can be used. These labels would have a machine readable identifier (i.e. bar code readable, OCR readable) that identifies the special service required. Moreover, the SSS 201 could be printed directly on the mail item 102 using the computer 111 and an associated color printer 113. This eliminates the need for physical labels.

Once the mail item 102 is completed, it is sent to the mail room 103 and fed to the mailing machine 105 that has been adapted to include the detector 105c that detects the presence of the SSS 201 and determines the special service required (step 303). In the case of the color coded SSS 201, the mailing machine 105 has a color sensor to detect the appropriate color. The mailing machine which includes its own processor and associated memory determines the type of service by reference to data stored in the memory that associates specific colors with specific services. In the case of the alternative labels as discussed above, the same principles apply except that the appropriate reader is substituted for the color sensor.

Once the mailing machine has detected and interpreted the SSS 201, it prints a special label for each of these mail items 102 (step 305) using the applicator 105*d*. Each label contains the server 107 URL and a unique serial number (SN) assigned by the mailing machine, such as for example, the 6 digit number 012345. Accordingly, the label contains an EAIM 13 for the server 107. For the purpose of identification, the label may also contain a human readable indication of postage value either directly or in a coded form. For example, <<345>> may be indicative of $3.45 worth of postage. The label may also contain a coded name of the service required, for example <<PI>> for the proof of induction, <<PD>> for the proof of delivery and <<PR>> for the proof of receipt. In the embodiment where the SSS 201 is printed directly on the mail item 102, the applicator 105d can be a separate printer or it can be eliminated and a printer associated with the postage meter 105c can be used.

During the process, the mailing machine 105 not only prints all of the labels required for the special services, but also outsorts the special service mail items 102 from the rest of the non-special service mail items being processed (step 307). At the end of processing a batch of mail items, the mail clerk places the labels with EAIM 13 at a prespecified location on the mail items 102, (for example left of the destination address block) (step 309). The clerk matches the postage value which has been imprinted on the mail item in the form of evidence of postage value (i.e. indicium, digital postage mark, etc.) and the postage value on the label. This process of matching may or may not be necessary depending on the need to identify information related to mail item 102 that is going to be delivered electronically to the server 107 URL. In the simplest form, all labels contain only the EAIM 13 and are applied to all outsorted mail items 102 one at a time. Alternatively, the process can be automated using an automatic label applicator that is connected to the mailing machine 105.

In yet another embodiment, instead of printing labels, the mailing machine can be modified to print the EAIM 13 directly onto the mailpiece in the same manner that the digital postage mark is applied. This procedure can be done during the initial SSS 201 detection by the mailing machine 105 or rerun of the mail items 102 through the mailing machine 105 after the initial sort of the mail items 102.

The final step of the mail room 103 processing is the submission of the mail items 102 to the postal distribution system (step 311). If the number of special service mail items 102 is relatively small they can be deposited into street letter boxes, otherwise they can be placed on trays and delivered directly to a postal retail or processing facility. In the latter case the tray can be labeled with the label containing the server 107 URL printed in a robust machine-readable form (linear or 2-dimensional bar code).

Once the mail enters the postal distribution system 21 it is processed as previously described in connection with FIG. 2. Additionally, the postal distribution system 21 can be modified to capture digital images of the special service mail items 102 at various points throughout the distribution system. Accordingly, the captured digital images together with the serial number, time, date, and location data of events (data shown in FIG. 5) are sent to the server 107 URL where it is stored in the database 109 (step 313). The originator of the mail item 102 sender can then access this information at the server 109 at their convenience using the computer device 111 and an internal communication network (typically a LAN) that permits communication with the server 107.

When the originator 101 wants to check on the status of a mail item, they connect, via computer device 111, to the server 107 (step 315). The originator compares the destination address of the recipient that they either remember or stored in their computer 111 with the destination address they can observe from the digital images received (and stored in database 109) by the server 107 from the postal distribution system 21 (step 315). Once there is a match (step 317), they can obtain the date, time, and location data from the server 107 (step 319). Alternatively, and in a much more complicated scenario, mailing machines 105 can be equipped with image/pattern recognition capabilities. In this case, if an originator identifies its name/address on the SSS 201, the mailing machine 105 can recognize the name and electronically send to the mailer the unique serial number assigned by it to the mail item 102 during the finishing process. Thus, the unique serial number would act as a pointer for future retrieval of the information from the server 109. It should be noted that the name and physical address on the SSS 201 can be read and linked by the mailing machine to an electronic address associated with the name/address by accessing an electronic address database, not shown. Alternatively, the electronic address can be contained in the SSS 201 and be directly obtained therefrom by the mailing machine 105.

In yet another embodiment the functionality of the server can be included in the mailing machine 105 so that the mailing machine 105 would have its own URL.

In yet another embodiment the SSS can have a unique identifier on it that is read by the mailing machine 105 and used as the unique identifier for the EAIM 13. Thus, the originator would use this unique serial number as the pointer. In this scenario originators would be supplied with controlled stock SSS 201 that have the unique numbers preprinted thereon, likely in a sequential manner. In the case where the SSS 201 is printed by the computer device 111 onto the mail item 102, the computer device can be programmed to generate the unique serial number which would be read by the mailing machine 105. Moreover, in order to ensure that duplicate serial numbers are not used, they can be obtained from the server 107 by the computer device 111 each time special mail items 102 are prepared. Further, it is possible unique number on the controlled stock could be read directly by the carrier distribution system 21 thereby eliminating the need for the mailing machine to print the unique number.

Additionally, other types of information can be included in the SSS 201. detected and read by the mailing machine 105, and converted into ASCII codes and supplied back to originator 101 in ASCII form. This complicates the system, but this and other improvements are entirely within the scope and the spirit of the present invention.

It can be appreciated that if the mailing machine 105 creates enough special services mail items 102 that require a tray or several trays for deposit into the postal stream, the mailing machine 105 can automatically create 1) tray labels containing the server 107 URL and a unique tray ID and 2) an electronic data base of records containing the serial number of all pieces in a given tray together with the tray ID (which information can be sent to the server 107). In this case, the tray label can be scanned at the point of entry into the postal distribution system and linked with other container information (if the tray is to be relabeled or enclosed into another container containing a multiplicity of trays from different sources) created by the postal operator. This arrangement enables the Track & Trace service as fully described above in connection with FIG. 2.

Another mailing environment where the system and method of the present invention can be beneficially employed is the production mail environment. In this environment, mail is typically automatically assembled by an insertion machine from pre-printed components such as an address bearing document and additional enclosures. There is always a control document containing machine readable coded information that instructs the insertion machine as to how to assemble the mail item. In this case, the control document is typically created in a data processing environment before the mail assembly process begins. The method of the present invention requires that the control document contain a special code indicating to the insertion machine the type of special service required by the mail piece. The insertion machine is equipped with a label printer/applicator that prints and attaches the required label (having the EAIM 13) at the end of the process after the mail piece is finished and postage has been printed thereon. The process is very much similar to the one described above for the mailing machine, except that it proceeds automatically at higher speeds.

Additional advantages and modifications will readily occur to those skilled in the art. Therefore, the invention in its broader aspects is not limited to the specific details and representative devices, shown and described herein. Accordingly, various modifications may be made without departing from the spirit or scope of the general inventive concept as defined by the appended claims. Such modifications may include for example:

1—While a specific postal carrier distribution system is shown, the inventive concepts can be incorporated in any carrier distribution system.

2—The unique sender generated identifier (EAIM) can be created by a postage meter which has been modified to include that functionality upon a user selection of a premium service.

3—The unique sender generated identifier has been shown as including an electronic address and a unique number. However, the unique sender generated identifier could simply be a unique number or any other unique identifier.

4—Application of the EAIM 13 and ID Tag 41 can be made directly on the mailpiece 1 or on labels that are subsequently placed on the labels. Moreover, means for applying the EAIM 13 and/or ID Tag 41 can be a printer or any other marking mechanism or information retaining device (such as an IC chip) which can be applied to the mail item 11 and be read.

5—The EAIM 13 can include other types of electronic addresses in addition to an e-mail address. For example, the electronic address can be a page number, a facsimile number, or a telephone number or any other type of address to which information can be sent electronically.

6—While an AFC 23 and convention bar code sensors/readers 27 have been shown, any devices that are capable of detecting and reading the EAIM 13 and the ID Tag 41 can be used as well.

7—The operator remote location 37 would include computer processing capability that would interface via a network with the data base 39 and the rest of the data gathering elements of the carrier distribution system 21 in order to facilitate the updates to the files 46 of the SMDB 47.

What is claimed is:

1. A method for tracking a special service delivery by a carrier of a mail item created by an office worker, the method comprising the computer-implemented steps of:

applying a special service indicator to the mail item during creation of the mail item;

sending the mail item to a mail room for final processing prior to submitting the mail item to the carrier for the special service delivery;

automatically detecting at the mail room the special service indicator on the mail item and determining the special service delivery required based on the detection of the special service indicator;

applying at the mail room a unique office worker generated identifier to the mail item, the unique identifier including an electronic address of a company server;

submitting the mail item with the unique identifier thereon to the carrier for the special service delivery;

receiving from the carrier at the electronic address obtained by the carrier from the unique identifier on the mail item information relating to the location of the mail item;

storing the information relating to the location of the mail item at the company server; and providing the office worker with access to the company server to obtain the information relating to the location of the mail item.

2. The method as recited in claim 1, wherein the special service indicator is a specific color associated the special service delivery.

3. The method as recited in claim 2, wherein at the mail room the specific color is automatically detected and identified to determine the special service delivery required by the mail item.

4. The method as recited in claim 3, wherein the specific color is selected from a plurality of different colors, each of the plurality of different colors serving as an indicator of a different special service delivery requirement.

5. The method as recited in claim 1, wherein the special service indicator is a label.

6. The method as recited in claim 1, wherein the special service indicator is printed on the mail item.

7. The method as recited in claim 1, wherein the special service indicator is machine readable.

8. The method as recited in claim 1, wherein the information relating to the mail item includes an image of the mail item.

9. The method as recited in claim 8, wherein the information relating to the location of the mail item further includes date, time, and location data.

10. The method as recited in claim 1, wherein automatically detecting the special service indicator is accomplished using a mailing machine.

11. The method as recited in claim 1, wherein the mail item is in a receptacle containing other mail items.

12. The method as recited in claim 11, wherein the location of the receptacle is determined.

13. The method as recited in claim 12, wherein the location of the mail item is determined by knowing the location of the receptacle.

* * * * *